United States Patent
Donner et al.

(10) Patent No.: US 12,048,362 B2
(45) Date of Patent: Jul. 30, 2024

(54) PLASTIC BAG HAVING INTERNAL BAG INSERTS AND PLASTIC BAG HAVING INTERNAL BAG INSERTS AND HOLDING STRAPS

(71) Applicant: Mettler Packaging LLC, Raynham, MA (US)

(72) Inventors: Georg Donner, Morbach (DE); Philipp Emanuel Schmitt, Lieser (DE)

(73) Assignee: Mettler Packaging LLC, Raynham, MA (US)

( * ) Notice: Subject to any disclaimer, the term of this patent is extended or adjusted under 35 U.S.C. 154(b) by 0 days.

(21) Appl. No.: 17/396,482

(22) Filed: Aug. 6, 2021

(65) Prior Publication Data
US 2022/0160091 A1   May 26, 2022

(30) Foreign Application Priority Data

Nov. 26, 2020 (EP) .................................. 20210070

(51) Int. Cl.
*A45C 13/02* (2006.01)
*A45C 3/04* (2006.01)

(52) U.S. Cl.
CPC ............... *A45C 13/02* (2013.01); *A45C 3/04* (2013.01); *A45C 2013/026* (2013.01)

(58) Field of Classification Search
CPC ...... A45C 13/02; A45C 3/04; A45C 2013/026
USPC .................................................... 224/148.1
See application file for complete search history.

(56) References Cited

U.S. PATENT DOCUMENTS

| | | | | |
|---|---|---|---|---|
| 2,089,297 | A * | 8/1937 | Read | B65D 5/4803 217/19 |
| 2,473,429 | A * | 6/1949 | Hinman | B65D 25/04 294/159 |
| 2,653,750 | A * | 9/1953 | Vines | B65D 71/0003 206/175 |
| 4,696,403 | A * | 9/1987 | Hoover | B29C 66/1122 206/428 |
| 4,872,766 | A * | 10/1989 | Dancy | B65D 31/12 383/122 |
| 5,046,860 | A * | 9/1991 | Brennan | A45C 3/04 D34/1 |
| D397,871 | S * | 9/1998 | Bellehchilli | D3/303 |

(Continued)

FOREIGN PATENT DOCUMENTS

DE    299 02 399 U1   7/2000
EP    0 311 824 A2   4/1989

OTHER PUBLICATIONS

European Search Report for Application No. EP 20 21 0070.7 dated May 12, 2021, 7 pgs.

*Primary Examiner* — Peter N Helvey
(74) *Attorney, Agent, or Firm* — Seed IP Law Group LLP

(57) ABSTRACT

A reusable plastic bag having as well as a reusable plastic bag with holding straps have internal bag inserts for receiving one or more beverage bottles. A plastic film layer is connected to the inside of a front and/or rear wail of the plastic bag at least in portions, by way of at least two welded or adhesively bonded areas which are spaced apart from one another and extend from a point spaced apart from a base edge of the bag towards or as far as an opening edge of the bag, so as to form the internal bag inserts, which are open towards the bag opening and are each configured and designed to receive one or more beverage bottles.

32 Claims, 8 Drawing Sheets

(56) References Cited

U.S. PATENT DOCUMENTS

| | | | | |
|---|---|---|---|---|
| 5,860,525 A * | 1/1999 | Bellehchili | ............ | B65D 31/12 |
| | | | | 206/443 |
| 6,402,378 B1 * | 6/2002 | Shackleton | ........ | B65D 88/1631 |
| | | | | 383/119 |
| D529,709 S * | 10/2006 | Swartz | ................... | B65D 33/08 |
| | | | | D3/202 |
| 7,247,132 B2 * | 7/2007 | Hugenholtz | ............. | B65D 5/48 |
| | | | | 493/920 |
| 8,789,702 B1 * | 7/2014 | Shingyouchi-Hall | ........................ | |
| | | | | A45D 34/00 |
| | | | | 206/581 |
| D774,747 S * | 12/2016 | Gamble | ......................... | D3/202 |
| 9,604,757 B2 * | 3/2017 | Spivack | ................... | B62B 3/146 |
| 2007/0175787 A1 * | 8/2007 | Lown | ........................ | A45F 3/16 |
| | | | | 206/427 |
| 2008/0063318 A1 * | 3/2008 | Gattino | ............. | B65D 81/3876 |
| | | | | 383/21 |
| 2008/0083629 A1 * | 4/2008 | Soucie | .................... | A45C 3/04 |
| | | | | 206/139 |
| 2009/0173646 A1 * | 7/2009 | Blomberg | .............. | B65D 31/12 |
| | | | | 206/139 |
| 2010/0084443 A1 * | 4/2010 | Adelman | ............. | A45C 7/0059 |
| | | | | 224/153 |
| 2010/0270342 A1 | 10/2010 | Barthel | | |
| 2011/0174824 A1 * | 7/2011 | Potts | ....................... | A45C 13/02 |
| | | | | 220/531 |
| 2015/0125096 A1 * | 5/2015 | Mulholland | ........... | B65D 31/02 |
| | | | | 383/38 |
| 2015/0246751 A1 * | 9/2015 | Spivack | .................... | B62B 3/146 |
| | | | | 383/38 |
| 2015/0296939 A1 * | 10/2015 | Green | ..................... | A45C 3/00 |
| | | | | 383/38 |
| 2016/0135572 A1 * | 5/2016 | Ilvedson | ................... | A45F 5/00 |
| | | | | 224/148.1 |

\* cited by examiner

PLASTIC BAG HAVING INTERNAL BAG INSERTS AND PLASTIC BAG HAVING INTERNAL BAG INSERTS AND HOLDING STRAPS

BACKGROUND

Technical Field

The present disclosure relates to a reusable plastic bag having internal bag inserts for holding one or more beverage bottles, to a reusable plastic bag according to the present disclosure having internal bag inserts and holding straps for receiving one or more beverage bottles, and to the use of the reusable plastic bag according to the present disclosure having internal bag inserts for receiving one or more beverage bottles.

Description of the Related Art

Transporting individual beverage bottles, in some cases a plurality of individual beverage bottles of different sizes or volumes, still proves problematic, especially when it has not been planned to purchase the beverage bottles. Typically, said beverage bottles are then transported in rucksacks or normal bags made of cotton or plastic, although it proves tricky to evenly load or distribute the beverage bottles. When said beverage bottles are transported and consequently move around, if not earlier, it is not possible to stop the individual beverage containers from slipping and colliding, which, in the case of glass bottles, may lead to damage during transport, such as the shattering of glass. In most cases, said bags or rucksacks are also not designed for the weight of multiple beverage bottles, and there is thus the potential for the fabric to tear or for handles to be ripped off. Moreover, it is in most cases not possible to temporarily securely place down a rucksack or bag filled with beverage bottles without the bottles tipping over, in some cases as a result of the uneven load.

The prior art discloses specific systems for transporting beverage bottles.

EP 0 311 824 A2 discloses a fold-open paper carrier bag for bottles, which is delimited by a base and an enclosure, a compartmentalized receiving space being formed when the carrier bag is folded open.

DE 299 02 399 U1 discloses a transporting bag for bottles based on a traditional plastic bag having a partitioned interior for inserting bottles.

However, the specific carrier bags or transporting bags for bottles known from the prior art have a distinct drawback that the partitioning of the interior is always predetermined as a result of said interior being divided into individual chambers for the beverage containers. A bottle-specific carrier bag of this kind has a limited range of use; a user would unlikely bring the bag along on a spontaneous shopping trip, in some cases not only to purchase beverage bottles. Some systems from the prior art, in some cases which are made of paper, are also not designed to be used multiple times.

BRIEF DESCRIPTION OF THE DRAWINGS

Features and advantages of the present disclosure are derived from the following description, in which expedient embodiments of the present disclosure are described by way of example on the basis of schematic drawings, in which.

BRIEF SUMMARY AND INITIAL DESCRIPTION

Figure 1:
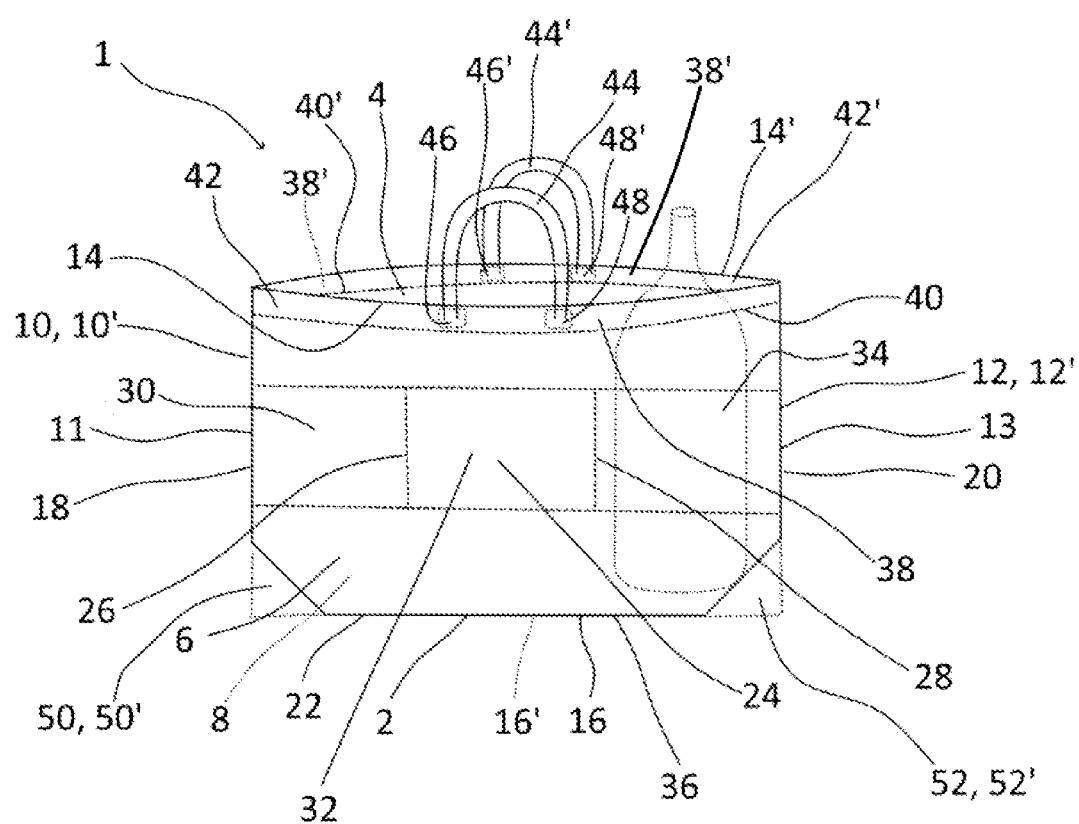
FIG. 1 is a schematic perspective view of a first embodiment of a plastic bag according to the present disclosure.

There is a need to provide a reusable plastic bag for receiving one or more beverage bottles that does not have the drawbacks of the carrier bags or transporting bags from the prior art, that is suitable for reliably transporting even heavy glass bottles on several occasions without damage to the material, and is also simple and cost-effective to manufacture in series using machines.

Accordingly, a plastic bag having a bag base and an opposite bag opening was discovered, said plastic bag comprising a front wall and a rear wall, each having a first side edge, an opposite second side edge, an opening edge and a base edge, wherein the front wall and the rear wall are, in the region of the first and second side edges and the base edges thereof, interconnected at least in portions, in some cases by way of welding, so as to form opposite first and second bag edges and a bag base edge, wherein the front wall and/or the rear wall comprise, on the inside, at least one plastic film layer, which extends from or from a point spaced apart from the first side edge towards or as far as the opposite second side edge and from the base edge or from a point spaced apart from the base edge towards or as far as the opening edge, wherein the plastic film layer of the front wall and/or the rear wall is connected to the inside of the front wall or rear wall at least in portions by way of at least two, in some cases three or four, welded or adhesively bonded areas, such as weld seams, which are spaced apart from one another, in some cases extend in parallel and extend from a point spaced apart from the base edge towards or as far as the opening edge, so as to form internal bag inserts, which are open towards the bag opening and are each configured and designed to receive one or more beverage bottles.

In an expedient embodiment of the plastic bag according to the present disclosure, the welded or adhesively bonded areas are or comprise punctiform or continuous welds or adhesive bonds of the front wall or rear wall to the associated plastic film layers, such as continuous weld seams. Said embodiment is advantageous in that the plastic film layers, if the internal bag inserts are not filled with a bottle or the like, rest flat against the front or rear wall, and the interior of the bag can be filled as usual with food, for example, without restriction. In an alternative embodiment of the plastic film bag according to the present disclosure, further plastic film layers, instead of the welded or adhesively bonded areas, are present in the form of side walls that extend from the front or rear wall as far as the already described plastic film layer. In this way, larger internal bag inserts for receive larger beverage bottles or beverage bottles having a larger volume can be generated.

The above-described embodiment of a plastic bag according to the present disclosure provides internal bag inserts for receiving one or more beverage bottles such that said beverage bottles are securely held in place within the plastic bag and do not fall over, slip, or collide, it also being possible for the internal bag inserts to remain unused and thus for the plastic bag according to the present disclosure to be used to transport other things, such as food. However, if not being used, the internal bag inserts are not present as chambers in the bag, as in known carrier bags that are specific for beverage containers, but rest flat against the inside of the front wall and/or rear wall so as not to obstruct the filling of the plastic bag with other things.

In a further expedient embodiment of the above-specified plastic carrier bag, the internal bag inserts can be open towards the bag base. In the case of said embodiment, the internal bag inserts nestle well against the front wall and/or rear wall, and the plastic bag according to the present disclosure is even cheaper and more cost-effective to manufacture on account of the lack of an additional weld or adhesive seam.

In an expedient embodiment of the plastic bag according to the present disclosure, the front wall and the rear wall are interconnected by a first side wall along the first side edges thereof and in some cases by a second side wall along the second side edges thereof. Alternatively, embodiments in which only the first side edges or only the second side edges are interconnected by a side wall are also conceivable. As a result of the additional side walls, a larger interior of the plastic bag according to the present disclosure can be generated, which in some cases also allows larger beverage bottles or beverages bottles having a larger volume to be transported. Furthermore, as a result of the presence of side walls, it is also conceivable to transport additional goods, such as food, in between the beverage bottles in the internal bag inserts.

In order to generate a larger interior and thus a larger capacity of the plastic bag according to the present disclosure, embodiments of the plastic bag in which the bag base has a base fold have also proved suitable, a first base fold portion extending from the base fold as far as the front wall, and a second base fold portion extending from the base fold as far as the rear wall. The above-described embodiment is suitable for being placed down during transport, without the beverage bottles falling over or tipping inside the plastic bag according to the present disclosure. Moreover, in the above-described embodiment of the plastic bag according to the present disclosure, in some cases it is possible to achieve a uniform weight distribution of the transported goods, such as the beverage bottles, within the plastic bag.

For stable transport, it has also proved expedient for the front wall or the rear wall, in some cases both the front wall and the rear wall, to comprise a hem at least in portions on the inside or outside in the region of the opening edges. For a visually more appealing look, the hem present at least in portions is present on the inside on the front wall or rear wall, in some cases on both the front wall and the rear wall. Certain embodiments of the plastic bag according to the present disclosure that have proved suitable are those in which the hem of the front wall or the hem of the rear wall, in some cases both the hem of the front wall and the hem of the rear wall, extends from the first side edge of the front wall or the rear wall as far as the second side edge of the front wall or the rear wall.

Highly expedient are those embodiments in which the hem of the front wall is connected, in some cases welded or adhesively bonded, to the front wall at a point spaced apart from the opening edge of said front wall in an extension from or from a point spaced apart from the first side edge towards or as far as the second side edge, in some cases by means of a continuous longitudinal weld. Alternatively or additionally, the hem of the rear wall is also connected, in some cases welded or adhesively bonded, to the rear wall at a point spaced apart from the opening edge of said rear wall in an extension from or at a point spaced apart from the first side edge towards or as far as the second side edge, in some cases by means of a continuous longitudinal weld. For both the hem of the front wall and the hem of the rear wall, embodiments in which both a weld and an adhesive bond are present are also conceivable.

In all the above-described embodiments of the plastic bag according to the present disclosure that comprise a hem, certain expedient embodiments are those in which the hem of the front and/or the rear wall is present as a continuation portion of the respective wall and is generated by one or more folds of said continuation portion.

It has proved expedient, in some cases with regard to simple, uncomplicated manufacturing of the plastic bags according to the present disclosure, for said plastic bags to be formed in one piece.

The present disclosure further provides the already described plastic bag which further comprises at least one holding strap connected to the front wall or at least one holding strap connected to the rear wall, each having a first and a second connecting region, in some cases both a holding strap connected to the front wall and a holding strap connected to the rear wall. In some cases, it has proved suitable for the holding strap connected to the front wall and the holding strap connected to the rear wall to be welded or adhesively bonded, or both welded and bonded, in the respective first and corresponding second connecting regions thereof in the region of the hem of the front or rear wall. Firstly, the described embodiment of the plastic bag according to the present disclosure having holding straps is easier to transport, and secondly, the holding straps attached in this way also exhibit improved load capacity and yield strength in comparison with conventional carrier bags on account of the reduced mechanical wear, in some cases when the plastic bag according to the present disclosure is used multiple times.

In an expedient embodiment of the above-specified plastic carrier bag having holding straps, the holding strap connected to the front wall by the first and second connecting regions thereof and/or the holding strap connected to the rear wall by the first and second connecting regions thereof can comprise, at least in portions in the region from the respective first to the corresponding second connecting region, a first flexible tubular hollow body or a single-layered or multi-layered material strip, such as a plastic material strip, that does not form a hollow body and is surrounded at least in portions or substantially entirely by a second flexible tubular hollow body.

For both the embodiment without holding straps and the embodiment with holding straps, it has proved expedient for the at least one plastic film layer to be connected, in some cases by way of welding, at least in portions to the first side edge and/or the second side edge.

In some cases, by combining the above-described features forming the reinforced hem with the features of the holding strap, a robust, heavy-duty plastic carrier bag is obtained.

To allow the plastic bag according to the present disclosure to stand upright independently in an improved manner and to save material, it has also proved advantageous for the front wall and the rear wall to comprise, in some cases triangular, cut-outs at the transition from the base edges to the first and second bag edges thereof.

Highly expedient are plastic bags according to the present disclosure in which the at least one plastic film layer has, in the direction from the base edge to the opening edge of the front wall, an extension which corresponds to 30 to 80%, in some cases 40 to 60%, of the extension of the front wall from the base edge to the opening edge. Alternatively or additionally, but in some cases additionally, it is expedient for also the at least one plastic film layer on the rear wall to have, in the direction from the base edge to the opening edge of the rear wall, an extension which corresponds to 30 to 80%, in some cases 40 to 60%, of the extension of the rear wall from the base edge to the opening edge.

For a compact design and minimal material usage, it has also proved expedient for the base-side opening of the internal bag insert to have a spacing from the bag base corresponding to 5 to 30%, in some cases 10 to 20%, of the extension of the front wall or the rear wall from the base edge to the opening edge.

In at least one embodiment, the at least one plastic film layer has, in the direction from the first to the second side edge of the front wall, an extension which corresponds to the extension of the front wall from the first to the second side edge. Alternatively or additionally, but in some cases additionally, it is expedient for also the at least one plastic film layer of the rear wall to have, in the direction from the first to the second side edge of the rear wall, an extension which corresponds to the extension of the rear wall from the first to the second side edge.

Embodiments of the plastic bag according to the present disclosure are expedient embodiments in which the front wall or the rear wall or the at least one plastic film layer or the side walls of the plastic bag or of the bag base or the hem of the front and/or rear wall or the holding straps are substantially based on or manufactured from thermoplastic materials. Highly expedient are embodiments of the plastic bag according to the present disclosure in which all of the components just listed or at least a large portion of the listed components are based on or manufactured from thermoplastic materials. However, any combinations with other textiles, such as natural fibers or synthetic fibers, are also conceivable. Suitable thermoplastic materials include polyolefins, such as polyethylene, and/or polyesters.

Conventional plastic-based bags have a drawback that they do not readily decompose in the environment. Therefore, the plastic bags according to the present disclosure may substantially consist of or comprise recyclable materials. It is advantageous for a uniform plastic material to be used throughout to obtain a single-variety plastic for recycling.

In a highly expedient embodiment of the plastic bag according to the present disclosure, the plastic film layer of the front wall can extend from the first side edge as far as the opposite second side edge, wherein the spacing between the first side edge and the welded or adhesively bonded area, in some cases in the form of a weld seam, which is arranged adjacently to said first side edge, is smaller than the spacing of at least one pair, or all pairs, of adjacent welded or adhesively bonded areas, and/or, in some cases and, wherein the spacing between the second side edge and the welded or adhesively bonded area, in some cases in the form of a weld seam, which is arranged adjacently to said second side edge, is smaller than the spacing of at least one pair, or all pairs, of adjacent welded or adhesively bonded areas, and/or, in some cases and, in that the plastic film layer of the rear wall extends from the first side edge as far as the opposite second side edge, wherein the spacing between the first side edge and the welded or adhesively bonded area, in some cases in the form of a weld seam, which is arranged adjacently to said first side edge, is smaller than the spacing of at least one pair, or all pairs, of adjacent welded or adhesively bonded areas, and/or, in some cases and, wherein the spacing between the second side edge and the welded or adhesively bonded area, in some cases in the form of a weld seam, which is arranged adjacently to said second side edge, is smaller than the spacing of at least one pair, or all pairs, of adjacent welded or adhesively bonded areas.

The above-described embodiment leads to internal bag inserts, adjacent to the side edges, that are smaller than the adjoining internal bag inserts on the inside thereof. Said internal bag inserts can be used for secure, localized receiving of fragmented, in some cases longitudinal, objects, but can also remain unused in contrast with the wider internal bag inserts on the inside thereof in order to make it easier to fill the remaining internal bag inserts, in some cases if internal bag inserts on the inside of the front wall and on the inside of the rear wall are to be filled with bottles at the same time.

In an alternative embodiment of the plastic bag according to the present disclosure, the plastic film layer of the front wall can extend from a point spaced apart from the first side edge towards, but not as far as, the opposite second side edge, wherein the spacing between the first side edge and the welded or adhesively bonded area, in some cases in the form of a weld seam, which is arranged adjacently to said first side edge, is smaller than the spacing of at least one pair, or all pairs, of adjacent welded or adhesively bonded areas, and/or, in some cases and, wherein the spacing between the second side edge and the welded or adhesively bonded area, in some cases in the form of a weld seam, which is arranged adjacently to said second side edge, is smaller than the spacing of at least one pair, or all pairs, of adjacent welded or adhesively bonded areas, and/or, in some cases and, wherein the plastic film layer of the rear wall can extend from a point spaced apart from the first side edge towards, but not as far as, the opposite second side edge, wherein the spacing between the first side edge and the welded or adhesively bonded area, in some cases in the form of a weld seam, which is arranged adjacently to said first side edge, is smaller than the spacing of at least one pair, or all pairs, of adjacent welded or adhesively bonded areas, and/or, in some cases and, wherein the spacing between the second side edge and the welded or adhesively bonded area, in some cases in the form of a weld seam, which is arranged adjacently to said second side edge, is smaller than the spacing of at least one pair, or all pairs, of adjacent welded or adhesively bonded areas.

Among the two above-mentioned embodiments of a plastic bag according to the present disclosure, highly expedient are those in which, in relation to the front wall, the spacing between the first side edge and the welded or adhesively bonded area, in some cases in the form of a weld seam, which is arranged adjacently to said first side edge, is at most 75%, in some cases at most 50%, of the spacing of at least one pair of adjacent welded or adhesively bonded areas, in some cases of the spacing of the pair of adjacent welded or adhesively bonded areas that has the smallest relative spacing from among the pairs of adjacent welded or adhesively bonded areas, and/or, in some cases and, in which in relation to the front wall, the spacing between the second side edge and the welded or adhesively bonded area, in some cases in the form of a weld seam, which is arranged adjacently to said second side edge, is at most 75%, in some cases at most 50%, of the spacing of at least one pair of adjacent welded or adhesively bonded areas, in some cases of the spacing of the pair of adjacent welded or adhesively bonded areas that has the smallest relative spacing from among the pairs of adjacent welded or adhesively bonded areas.

Alternatively or additionally, in relation to the rear wall, the spacing between the first side edge and the welded or adhesively bonded area, in some cases in the form of a weld seam, which is arranged adjacently to said first side edge, can be at most 75% or at most 50%, of the spacing of at least one pair of adjacent welded or adhesively bonded areas, in some cases of the spacing of the pair of adjacent welded or adhesively bonded areas that has the smallest relative spacing from among the pairs of adjacent welded or adhesively bonded areas, and/or, in some cases and, in relation to the rear wall, the spacing between the second side edge and the welded or adhesively bonded area, in particular in the form of a weld seam, which is arranged adjacently to said second side edge, can be at most 75% or at most 50%, of the spacing of at least one pair of adjacent welded or adhesively bonded areas, in some cases of the spacing of the pair of adjacent welded or adhesively bonded areas that has the smallest relative spacing from among the pairs of adjacent welded or adhesively bonded areas.

Among the plastic bags according to the present disclosure, highly expedient are those in which, in relation to the front wall, the spacing of at least two pairs, or all pairs, of adjacent welded or adhesively bonded areas, in some cases in the form of weld seams, is substantially the same, and/or in which, in relation to the rear wall, the spacing in at least two pairs, or all pairs, of adjacent welded or adhesively bonded areas, is substantially the same.

The spacing of adjacent welded or adhesively bonded areas in a pair of such welded or adhesively bonded areas or in all pairs of adjacent welded or adhesively bonded areas, is in some cases in the range of 8 to 18 cm, in some further cases in the range of 10 to 16 cm, and in some even further cases in the range of 12.0 to 14.0 cm.

Highly stable and thus frequently reusable plastic bags according to the present disclosure are also obtained by the front wall being multi-layered, in some cases double-layered, and/or, in some cases and, by the rear wall being multi-layered, in some cases double-layered. Among said plastic bags according to the present disclosure, highly expedient are those in which the front-wall-side plastic film layer is connected only to the internal layer of the multi-layered front wall by the welded or adhesively bonded areas, in some cases in the form of weld seams, wherein, alternatively or additionally, in some cases additionally, the rear-wall-side plastic film layer can be connected only to the internal layer of the multi-layered rear wall by the welded or adhesively bonded areas, in some cases in the form of weld seams.

In expedient embodiments the plastic film layer of the front wall and/or, in some cases and, the plastic film layer of the rear wall comprise(s) LD polyethylene and are/is in some cases formed therefrom, and/or the plastic film layers of the front wall and/or, in some cases and, of the rear wall have/has an average or absolute thickness in the range of 30 to 80 µm, in some cases in the range of 35 to 60 µm. Plastic film layers of this kind generally are sufficiently stretchable and also allow larger objects, such as bottles, to be inserted into the internal bag inserts.

The present disclosure further discloses the use of the plastic bag according to the present disclosure for transporting beverage bottles, such as beverage bottles having a volume of up to 2 liters of liquid.

With the plastic bag according to the present disclosure having internal bag inserts, the plastic bag according to the present disclosure having internal bag inserts and holding straps, and the use of the plastic bag according to the present disclosure, it was surprisingly found that individual or multiple beverage bottles can be securely transported, without the individual beverage bottles slipping, tipping over or colliding within the plastic bag. It is also possible to securely place down the plastic bag during transport. The plastic bag can be easily and cost-effectively manufactured in series, the material being reusable and durable and having an extremely high load capacity and wear resistance. However, the plastic bag according to the present disclosure is not only limited to the transport of beverage bottles: if other goods, such as food, are transported in the plastic bag according to the present disclosure, the internal bag inserts are not obstructive or a hindrance but nestle flat against the inside of the front or rear wall of the plastic bag.

DETAILED DESCRIPTION

FIG. 1 is a schematic perspective view of a plastic bag 1 according to the present disclosure. Said plastic bag comprises a bag base 2 having a bag base fold 36 and an opposite bag opening 4, and comprises a front wall 6 and a rear wall 8, each having a first side edge 10, 10', an opposite second side edge 12, 12', an opening edge 14, 14', and a base edge 16, 16'. In the embodiment shown, the front wall 6 and the rear wall 8 are interconnected in the region of the first 10, 10' and second side edges 12, 12' and the base edges 16, 16' thereof by means of welding so as to form a first bag edge 18, a second bag edge 20 and a bag base edge 22. In the embodiment shown, the front wall 6 has, on the inside, a plastic film layer 24 that extends from the first side edge 10 towards the second side edge 12 and extends from a point spaced apart from the base edge 16 towards the opening edge 14, the plastic film layer 24 having two welded or adhesively bonded areas 26, 28 that are connected in portions to the inside of the front wall 6 and form internal bag inserts 30, 32 and 34, which are open towards the bag base 2. By way of example, a beverage bottle is shown being held in the internal bag insert 34. Furthermore, in the embodiment shown, the rear wall 8 is likewise provided with a plastic film layer (not shown) on the inside in a similar manner.

The embodiment of the plastic bag 1 according to the present disclosure shown here further comprises, on the inside of the front wall 6 and the rear wall 8, a hem 38, 38' that is formed by folding over continuation portions 42, 42' on the front wall 6 and the rear wall 8, respectively. The hems 38, 38' are respectively connected to the inside of the front wall 6 and the rear wall 8 by continuous longitudinal welds 40, 40'. Furthermore, the embodiment of the plastic bag 1 according to the present disclosure shown here comprises, on the front wall 6 and the rear wall 8, holding straps 44, 44' that are attached to the inside of the reinforced hem 38, 38' by a first connecting region 46, 46' and a second connecting region 48, 48'. Moreover, the shown plastic bag 1 has triangular cut-outs 50, 50', 52, 52' on the bag base 2.

Figure 2:
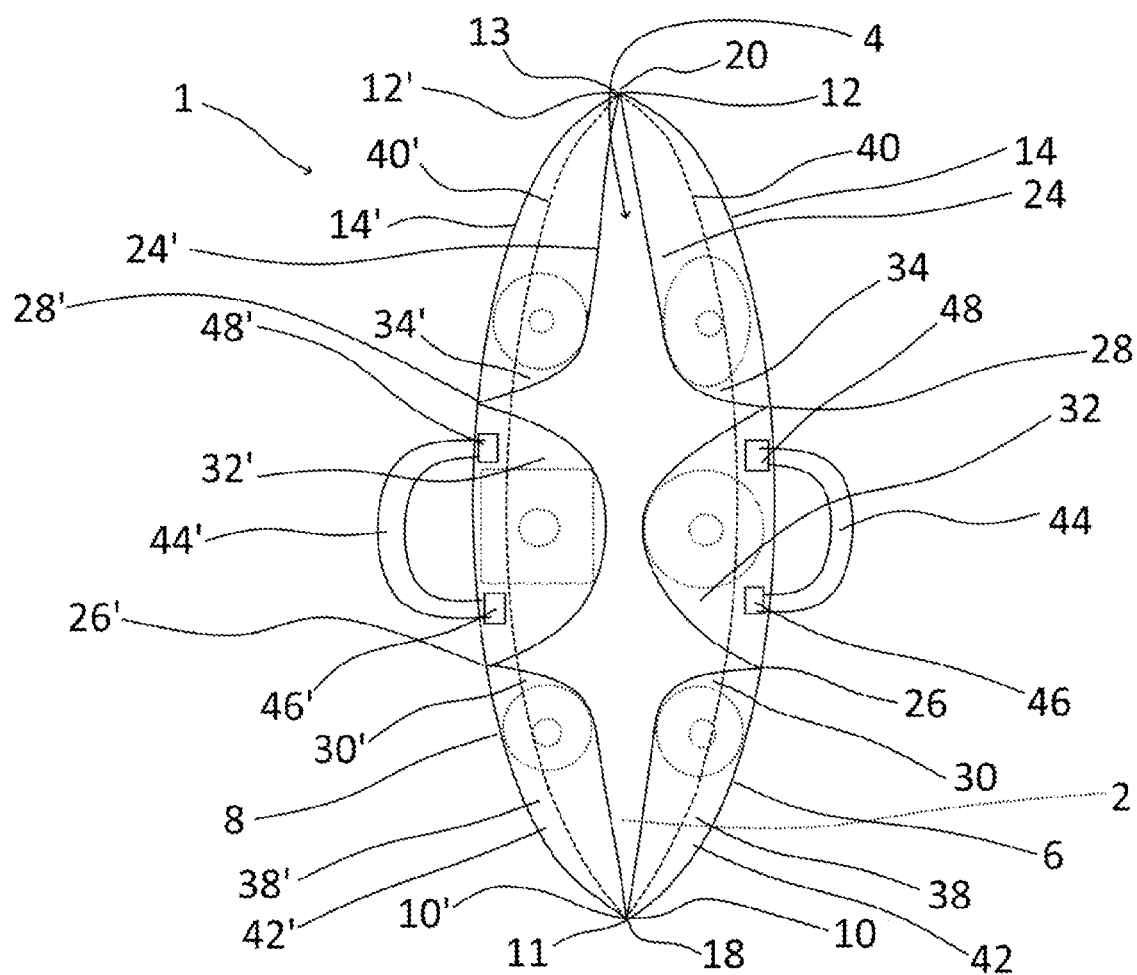
FIG. 2 is a schematic plan view of the embodiment of the plastic bag according to the present disclosure according to FIG. 1.

FIG. 2 is a schematic plan view of the embodiment of the plastic bag 1 according to the present disclosure according to FIG. 1. The plastic film layers 24, 24' are respectively connected to the inside of the front wall 6 and the rear wall 8 by welded or adhesively bonded areas 26, 26', 28, 28' such that a total of six internal bag inserts 30, 30', 32, 32', 34 and 34' are formed for receiving six beverage bottles. If there are no bottles in the internal bag inserts 30, 30', 32, 32', 34, the plastic film layers 24, 24' rest against the inside of the front wall 6 or the rear wall 8 and do not hinder the ordinary filling of the plastic bag 1.

Figure 3:
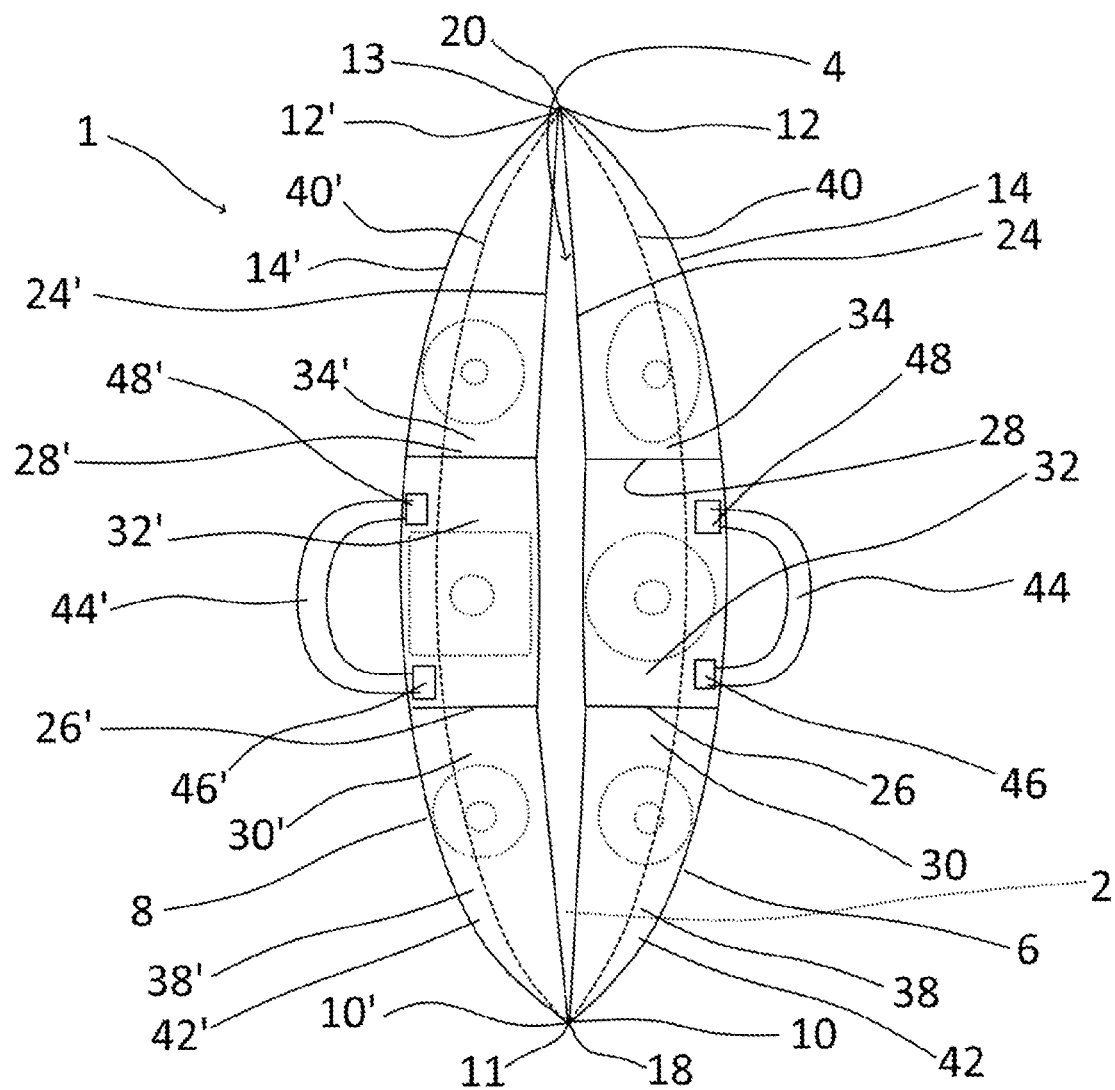
FIG. 3 is a schematic plan view of an alternative embodiment of the plastic bag according to the present disclosure.

FIG. 3 is a schematic plan view of a further embodiment of a plastic bag 1 according to the present disclosure. Said plastic bag differs from the embodiment according to FIG. 2 in that the welded or adhesively bonded areas 26, 26', 28, and 28' are not formed as punctiform or continuous welds or bonds to the front wall 6 or rear wall 8, but as separate film partitions, which allows larger beverage bottles or beverage bottles having a larger volume to be held.

Figure 4:
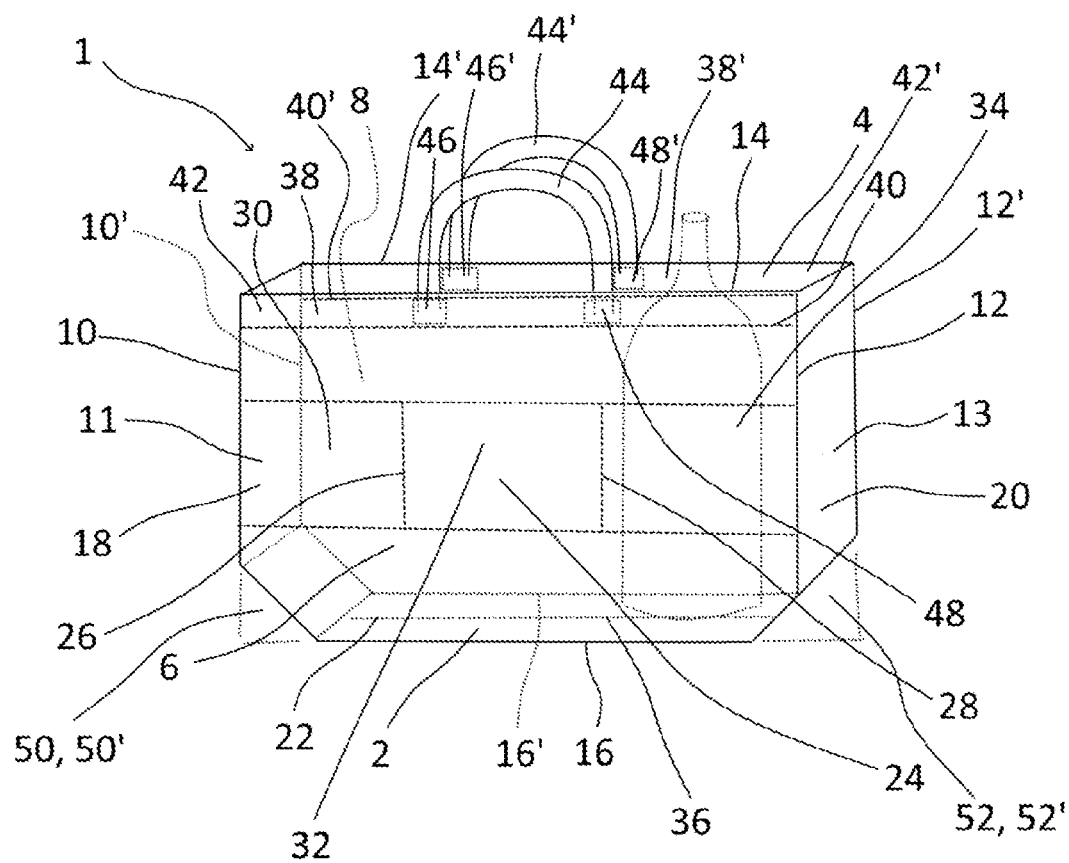
FIG. 4 is a schematic perspective view of an alternative embodiment of a plastic bag according to the present disclosure.

FIG. 4 is a schematic view of an alternative embodiment of a plastic bag 1 according to the present disclosure. Said plastic bag differs from the embodiment according to FIG. 1 in that the first side edges 10, 10' and second side edges 12, 12' of the front wall 6 and the rear wall 8 are interconnected, in some cases welded to one another, by a first side wall 11 and a second side wall 13. The first bag edge 18 and the second bag edge 20 are accordingly formed by the center lines of the first side wall 11 and the second side wall 13, which extend from the bag base 2 as far as the bag opening 4.

Figure 5:
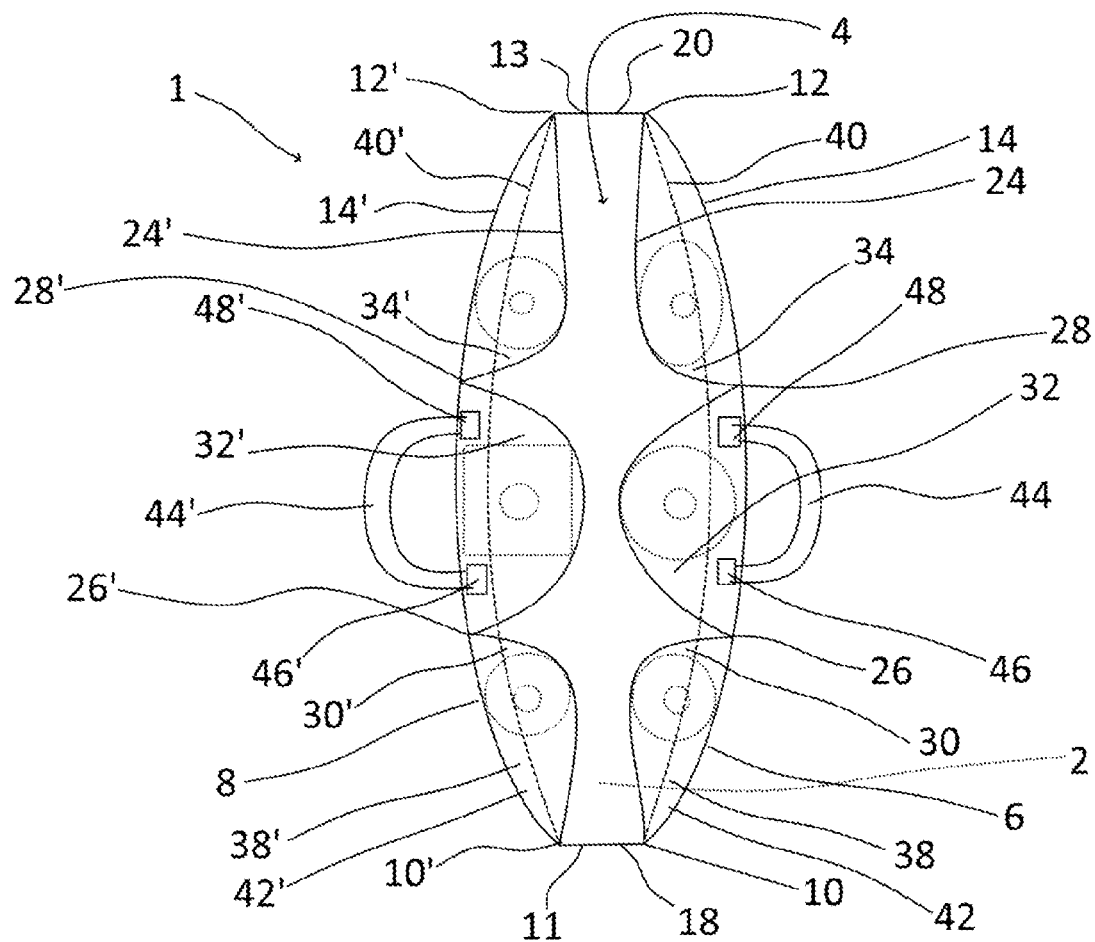
FIG. 5 is a schematic plan view of the embodiment of the plastic bag according to the present disclosure according to FIG. 4.

FIG. 5 is a schematic plan view of the embodiment of the plastic bag 1 according to the present disclosure according to FIG. 4. The plastic film layers 24, 24' are respectively connected to the inside of the front wall 6 and the rear wall 8 by welded or adhesively bonded areas 26, 26', 28, 28' such that a total of six internal bag inserts 30, 30', 32, 32', 34 and 34' are formed for receiving six beverage bottles.

Figure 6:
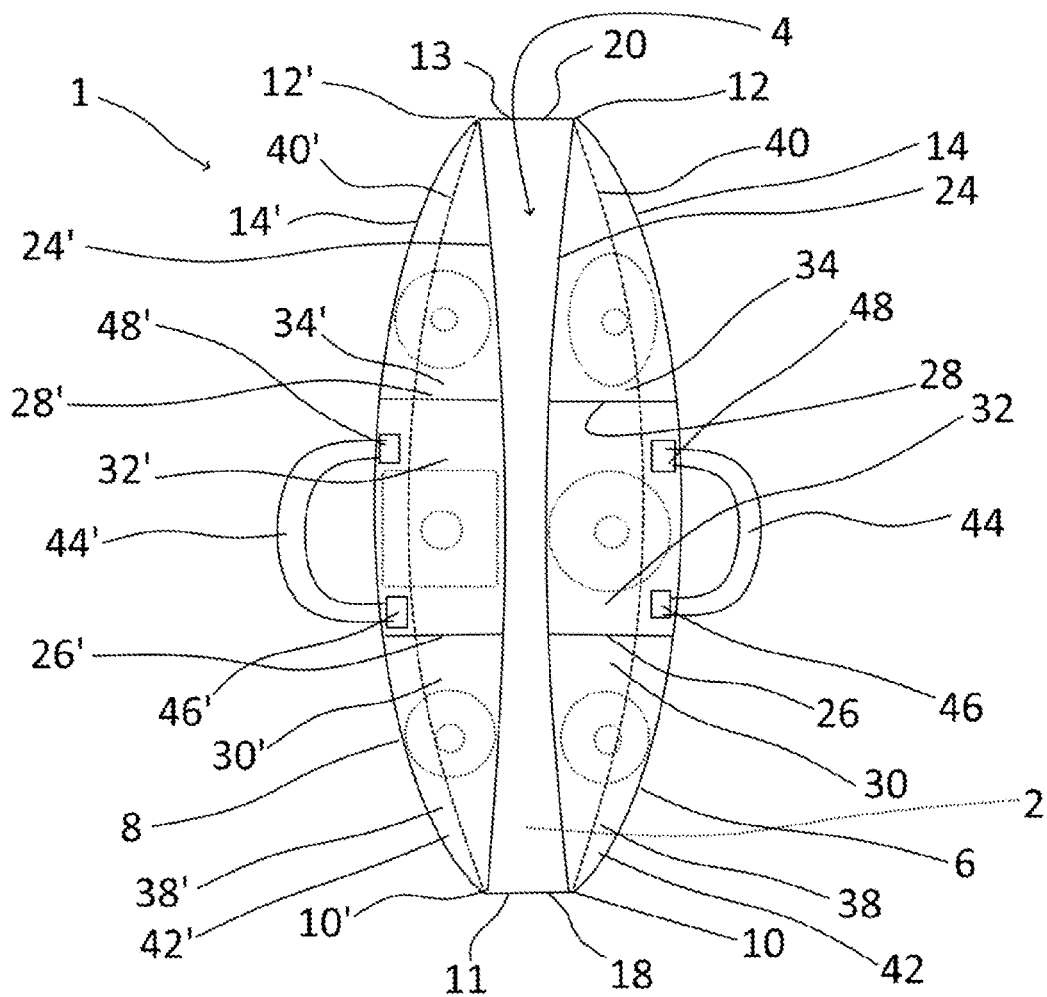
FIG. 6 is a schematic plan view of an alternative embodiment of the plastic bag according to the present disclosure.

FIG. 6 is a schematic plan view of a further embodiment of a plastic bag 1 according to the present disclosure. Said plastic bag differs from the embodiment according to FIG. 5 in that the welded or adhesively bonded areas 26, 26', 28, and 28' are not formed as punctiform or continuous welds or bonds to the front wall 6 or rear wall 8, but as separate film partitions, which allows larger beverage bottles or beverage bottles having a larger volume to be held.

Figure 7:
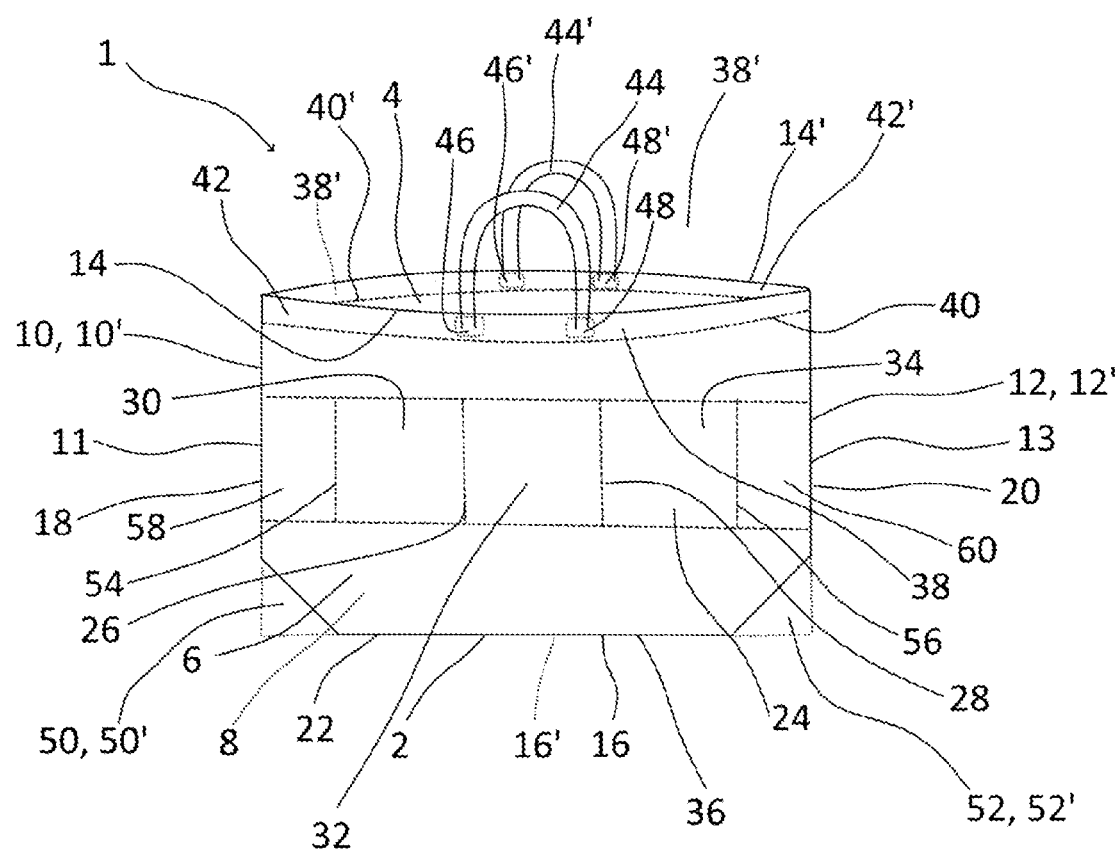
FIG. 7 is a schematic perspective view of a further embodiment of a plastic bag according to the present disclosure.

FIG. 7 is a schematic view of a highly expedient, alternative embodiment of a plastic bag 1 according to the present disclosure. Said plastic bag differs from the embodiment according to FIG. 1 in that a welded or adhesively bonded area 54 is present in the form a weld seam for fastening the plastic film layer 24 adjacently to the first side edge 10, said weld seam having a spacing from said first side edge 10 that is smaller, in some cases smaller by approximately half, than the spacing between the welded or adhesively bonded area 26 and the welded or adhesively bonded area 54, between the welded or adhesively bonded area 26 and the welded or adhesively bonded area 28, and also between the welded or adhesively bonded area 28 and the welded or adhesively bonded area 56, each in the form of a weld seam. Furthermore, the welded or adhesively bonded area 56 in the form of a weld seam for fastening the plastic film layer 24, said area being adjacent to the second side edge 12, has a spacing from said second side edge 12 that is smaller, in some cases smaller by approximately half, than the spacing between the welded or adhesively bonded area 26 and the welded or adhesively bonded area 54, between the welded or adhesively bonded area 26, and the welded or adhesively bonded area 28, and also between the welded or adhesively bonded area 28 and the welded or adhesively bonded area 56, each in the form of a weld seam. The plastic film layer 24' of the rear wall 8 can be connected to the inside of said rear wall in the same way as described above for the front wall. For reasons of better clarity, this is not shown in FIG. 7, but in FIG. 8.

Figure 8:
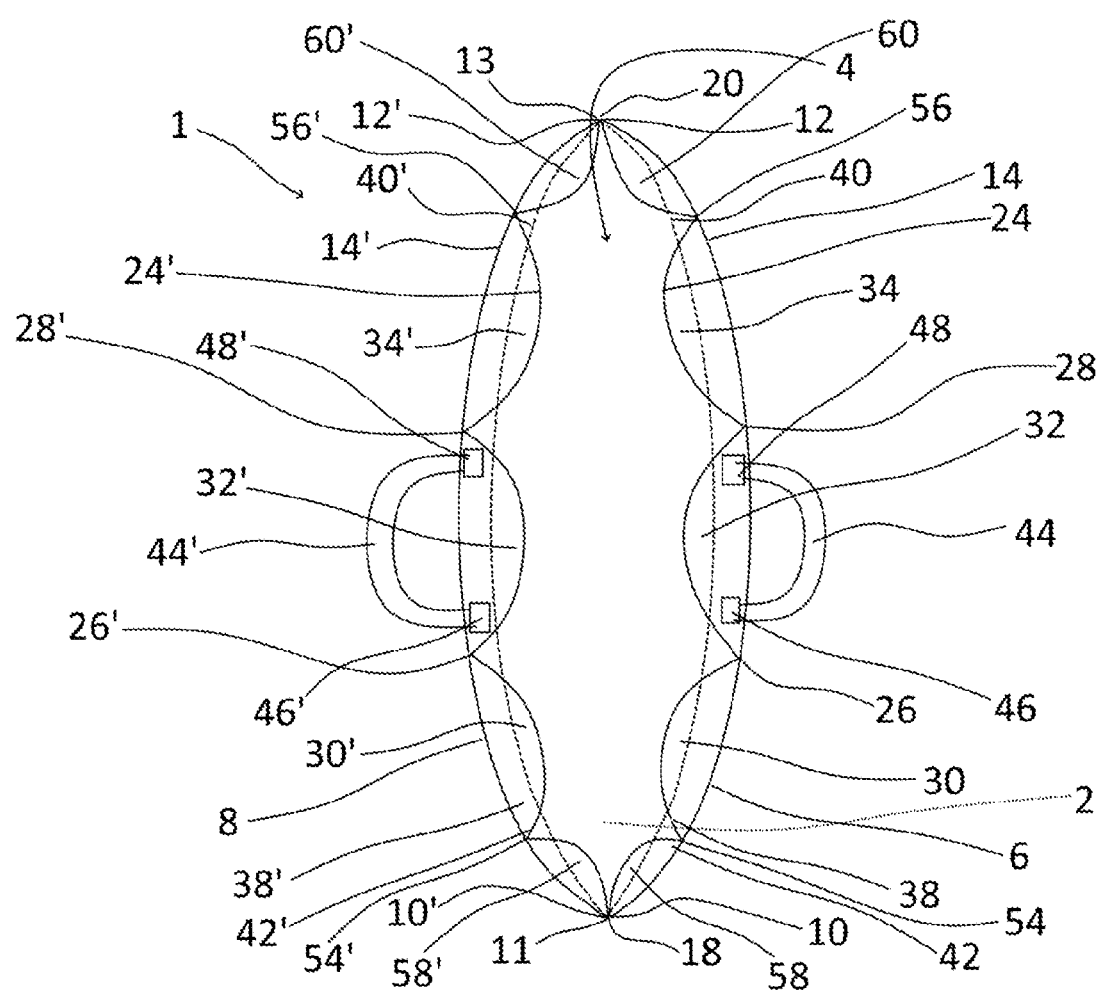
FIG. 8 is a schematic plan view of the embodiment of the plastic bag according to the present disclosure according to FIG. 7.

FIG. 8 is a schematic plan view of the embodiment of the plastic bag 1 according to the present disclosure according to FIG. 7. The plastic film layers 24, 24' are connected to the inside of the front wall 6 and the rear wall 8 by welded or adhesively bonded areas 26, 26', 28, 28' and 54, 54', 56, 56', each in some cases in the form of weld seams, such that a total of six larger internal bag inserts 30, 30', 32, 32', 34 and 34' and four smaller internal bag inserts 58, 58', 60, 60' are formed. By the four smaller internal bag inserts remaining unused, there is regularly still enough storage space for receiving further products between the plastic film layers 24, 24', even when bottles are held in the larger internal bag inserts.

The features of the present disclosure disclosed in the above description, the claims, and the drawings may be essential either individually or in any desired combination for carrying out the various embodiments of the present disclosure.

Furthermore, the various embodiments described above can be combined to provide yet further embodiments. All of the patents and publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plastic bag having a bag base and an opposite bag opening, comprising:
    a front wall and a rear wall, each having a first side edge, an opposite second side edge, an opening edge, and a base edge,
    wherein the front wall and the rear wall are, in a region of the first and second side edges and the base edges thereof, directly interconnected by way of welding the front wall to the rear wall, at least in portions, so as to form a first bag edge, an opposite second bag edge, and a bag base edge,
    wherein the front wall and/or the rear wall comprise, on the inside, at least one plastic film layer which extends from or from a point spaced apart from the first side edge towards or as far as the opposite second side edge and from the base edge or from a point spaced apart from the base edge towards or as far as the opening edge,
    wherein the at least one plastic film layer of the front wall and/or the rear wall is connected to an internal layer of the front wall or rear wall respectively, at least in portions, by way of at least two welded areas which are spaced apart from one another and extend from a point spaced apart from the base edge towards or as far as the opening edge, so as to form internal bag inserts, which are open towards the bag opening and are each configured and designed to receive one or more beverage bottles, wherein the front wall is multi-layered and when the front wall comprises the at least one plastic film layer, the at least one plastic film layer is connected only to the internal layer of the multi-layered front wall by the at least two welded areas, and wherein the rear wall is multi-layered and when the rear wall comprises the at least one plastic film layer, the at least one plastic film layer is connected only to the internal layer of the multi-layered rear wall by the at least two welded areas.

2. The plastic bag according to claim 1, wherein the internal bag inserts are open towards the bag base.

3. The plastic bag according to claim 1, wherein the bag base comprises a base fold, wherein a first base fold portion extends from the base fold as far as the front wall, and a second base fold portion extends from the base fold as far as the rear wall.

4. The plastic bag according to claim 1, wherein the front wall and/or the rear wall comprise a hem at least in portions on the inside and/or outside in the region of the opening edges.

5. The plastic bag according to claim 4, wherein the hem of the front wall and/or the hem of the rear wall extends from the first side edge of the front wall or of the rear wall respectively as far as the opposite second side edge of the front wall or of the rear wall respectively.

6. The plastic bag according to claim 4, wherein:
the hem of the front wall is connected to the front wall at a point spaced apart from the opening edge of said front wall in an extension leading from or from a point spaced apart from the first side edge towards or as far as the second side edge, and/or
the hem of the rear wall is connected to the rear wall at a point spaced apart from the opening edge of said rear wall in an extension leading from or from a point spaced apart from the first side edge towards or as far as the second side edge.

7. The plastic bag according to claim 4, wherein:
the hem of the front wall is configured to be double-layered or multi-layered as a continuation portion of the front wall by way of one or more folds, and/or
the hem of the rear wall is configured to be double-layered or multi-layered as a continuation portion of the rear wall by way of one or more folds.

8. The plastic bag according to claim 1, further comprising at least one holding strap connected to the front wall and/or at least one holding strap connected to the rear wall, each having a first and a second connecting region.

9. The plastic bag according to claim 8, wherein the holding strap connected to the front wall by the first and second connecting regions thereof and/or the holding strap connected to the rear wall by the first and second connecting regions thereof comprise(s), at least in portions in the region from the respective first connecting region to the corresponding second connecting region, a first flexible tubular hollow body or a single-layered or multi-layered material strip that does not form a hollow body and is surrounded in portions or substantially entirely by a second flexible tubular hollow body.

10. The plastic bag according to claim 1, wherein the at least one plastic film layer is connected at least in portions to the first side edge and/or the second side edge.

11. The plastic bag according to claim 1, wherein the front wall and the rear wall comprise cut-outs at the transition from the base edges to the first and second bag edges thereof.

12. The plastic bag according to claim 1, wherein:
the at least one plastic film layer has, in the direction from the base edge to the opening edge of the front wall, an extension which corresponds to 30 to 80% of an extension of the front wall from the base edge to the opening edge, and/or
the at least one plastic film layer has, in the direction from the base edge to the opening edge of the rear wall, an extension which corresponds to 30 to 80% of an extension of the rear wall from the base edge to the opening edge.

13. The plastic bag according to claim 2, wherein the base-side opening of the internal bag inserts has a spacing from the bag base corresponding to 5 to 30% of an extension of the front wall and/or rear wall from the base edge to the opening edge thereof.

14. The plastic bag according to claim 1, wherein:
the at least one plastic film layer has, in the direction from the first side edge to the second side edge of the front wall, an extension which corresponds to an extension of the front wall from the first side edge to the second side edge, and/or
the at least one plastic film layer has, in the direction from the first side edge to the second side edge of the rear wall, an extension which corresponds to an extension of the rear wall from the first side edge to the second side edge.

15. The plastic bag according to claim 1, wherein
the front wall and/or the rear wall and/or the at least one plastic film layer of the plastic bag and/or of the bag base and/or the hem of the front and/or rear wall and/or the holding straps are substantially based on or manufactured from a thermoplastic material.

16. The plastic bag according to claim 1, wherein the bag substantially consists of or comprises recyclable material.

17. The plastic bag according to claim 1, wherein the bag is formed substantially in one piece.

18. The plastic bag according to claim 1, wherein:
the plastic film layer of the front wall extends from the first side edge as far as the opposite second side edge,
wherein a spacing between the first side edge and a welded area arranged adjacently to said first side edge is smaller than a spacing of at least one pair, or all pairs, of adjacent welded areas, and/or
wherein a spacing between the second side edge and a welded area arranged adjacently to said second side edge is smaller than a spacing of at least one pair, or all pairs, of adjacent welded areas, and/or
the plastic film layer of the rear wall extends from the first side edge as far as the opposite second side edge,
wherein a spacing between the first side edge and a welded area arranged adjacently to said first side edge is smaller than a spacing of at least one pair, or all pairs, of adjacent welded areas, and/or
wherein the spacing between the second side edge and a welded area arranged adjacently to said second side edge is smaller than a spacing of at least one pair, or all pairs, of adjacent welded areas.

19. The plastic bag according to claim 1, wherein:
the plastic film layer of the front wall extends from or from a point spaced apart from the first side edge towards, but not as far as, the opposite second side edge, wherein a spacing between the first side edge and a welded area arranged adjacently to said first side edge is smaller than a spacing of at least one pair, or all pairs, of adjacent welded areas, and/or wherein a spacing between the second side edge and a welded area arranged adjacently to said second side edge is smaller than a spacing of at least one pair, or all pairs, of adjacent welded areas, and/or the plastic film layer of the rear wall extends from a point spaced apart from the first side edge towards, but not as far as, the opposite second side edge, wherein a spacing between the first side edge and a welded area arranged adjacently to said first side edge is smaller than the spacing of at least one pair, or all pairs, of adjacent welded, and/or wherein a spacing between the second side edge and a welded area arranged adjacently to said second side edge is smaller than a spacing of at least one pair, or all pairs, of adjacent welded areas.

20. The plastic bag according to claim 18, wherein:
in relation to the front wall, the spacing between the first side edge and the welded area, which is arranged adjacently to said first side edge, is at most 75% or at most 50% of the spacing of at least one pair of adjacent welded areas, and/or
in relation to the front wall, the spacing between the second side edge and the welded area, which is arranged adjacently to said second side edge, is at most 75% or at most 50% of the spacing of at least one pair of adjacent welded areas.

21. The plastic bag according to claim 18, wherein:
in relation to the rear wall, the spacing between the first side edge and the welded area, which is arranged adjacently to said first side edge, is at most 75% or at most 50% of the spacing of at least one pair of adjacent welded areas, and/or
in relation to the rear wall, the spacing between the second side edge and the welded area, which is arranged adjacently to said second side edge, is at most 75% or at most 50% of the spacing of at least one pair of adjacent welded areas.

22. The plastic bag according to claim 18, wherein:
in relation to the front wall, the spacing of at least two pairs or all pairs of adjacent welded areas is substantially the same, and/or
in relation to the rear wall, the spacing of at least two pairs or all pairs of adjacent welded areas is substantially the same.

23. The plastic bag according to claim 1, wherein:
the plastic film layer of the front wall and/or of the rear wall comprise(s) or are/is formed from LD polyethylene, and/or
the plastic film layer of the front wall and/or of the rear wall have/has an average or absolute thickness in the range of 30 to 80 μm.

24. Use of the plastic bag according to claim 1 for transporting beverage bottles.

25. The plastic bag according to claim 1, wherein the plastic film layer of the front wall and/or the rear wall is connected to the internal layer of the front wall or rear wall at least in portions by three or four weld seams.

26. The plastic bag according to claim 1, wherein the at least two welded areas, which are spaced apart from one another, extend substantially in parallel.

27. The plastic bag according to claim 6, wherein:
the hem of the front wall is welded to the front wall at the point spaced apart from the opening edge of said front wall in the extension leading from or from the point spaced apart from the first side edge towards or as far as the second side edge by way of a continuous longitudinal weld, and/or
the hem of the rear wall is welded to the rear wall at the point spaced apart from the opening edge of said rear wall in the extension leading from or from the point spaced apart from the first side edge towards or as far as the second side edge by way of a continuous longitudinal weld.

28. The plastic bag according to claim 8, wherein the holding strap connected to the front wall and the holding strap connected to the rear wall are welded in the respective first and corresponding second connecting regions in the region of the hem of the front and/or rear wall respectively.

29. The plastic bag according to claim 15, wherein the thermoplastic material comprises a polyolefin and/or polyester.

30. The plastic bag according to claim 20, wherein:
the spacing between the first side edge and the welded area is at most 75% or at most 50% of the spacing of the pair of adjacent welded areas that has the smallest relative spacing from among the pairs of adjacent welded, and/or
the spacing between the second side edge and the welded area is at most 75% or at most 50% of the spacing of the pair of adjacent welded areas that has the smallest relative spacing from among the pairs of adjacent welded.

31. The plastic bag according to claim 21, wherein:
the spacing between the first side edge and the welded area is at most 75% or at most 50% of the spacing of the pair of adjacent welded areas that has the smallest relative spacing from among the pairs of adjacent welded areas, and/or
the spacing between the second side edge and the welded area is at most 75% or at most 50% of the spacing of the pair of adjacent welded areas that has the smallest relative spacing from among the pairs of adjacent welded areas.

32. A plastic bag having a bag base and an opposite bag opening, comprising:
a front wall and a rear wall, each having a first side edge, an opposite second side edge, an opening edge, and a base edge,
wherein the front wall and the rear wall are, in a region of the first and second side edges and the base edges thereof, directly interconnected by way of welding the front wall to the rear wall, at least in portions, so as to form a first bag edge, an opposite second bag edge, and a bag base edge,
wherein, on the inside of the plastic bag, the front wall and/or the rear wall comprise at least one plastic film layer which extends from the first side edge to the opposite second side edge and from the base edge or from a point spaced apart from the base edge towards or as far as the opening edge, wherein the at least one plastic film layer is welded into the welding of the front wall to the rear wall at the first bag edge and the opposite second bag edge,
wherein each of the front wall and the rear wall is multi-layered including at least an internal layer that is separate from another layer or layers, and the at least one plastic film layer of the front wall and/or the rear wall is connected to the internal layer of the front wall or rear wall respectively, at least in portions, by way of at least two welded areas which are spaced apart from one another and extend from a point spaced apart from the base edge towards or as far as the opening edge, so as to form internal bag inserts which are open towards the bag opening, wherein when the front wall comprises the at least one plastic film layer, the at least two welded areas connect the at least one plastic film layer only to the internal layer of the multi-layered front wall, and wherein when the rear wall comprises the at least one plastic film layer, the at least two welded areas connect the at least one plastic film layer only to the internal layer of the multi-layered rear wall.

* * * * *

UNITED STATES PATENT AND TRADEMARK OFFICE
CERTIFICATE OF CORRECTION

PATENT NO. : 12,048,362 B2  
APPLICATION NO. : 17/396482  
DATED : July 30, 2024  
INVENTOR(S) : Georg Donner et al.

Page 1 of 1

It is certified that error appears in the above-identified patent and that said Letters Patent is hereby corrected as shown below:

On the Title Page

Item (57) Abstract, Line 4:
"rear wail of the" should read: --rear wall of the--.

Signed and Sealed this  
Eighth Day of October, 2024

Katherine Kelly Vidal  
*Director of the United States Patent and Trademark Office*